US006553145B1

(12) United States Patent
Kang et al.

(10) Patent No.: US 6,553,145 B1
(45) Date of Patent: Apr. 22, 2003

(54) VIDEO DATA TRANSCEIVING DEVICE, AND TRANSCEIVING METHOD THEREOF

(75) Inventors: Sang-ug Kang, Taegu (KR); Kook-yeol Yoo, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/431,919

(22) Filed: Nov. 2, 1999

(30) Foreign Application Priority Data

Nov. 2, 1998 (KR) ............................. 98-46823

(51) Int. Cl.[7] ........................... G06K 9/36; H03M 7/46; H03M 13/03

(52) U.S. Cl. ........................ 382/239; 382/232; 341/63; 714/795

(58) Field of Search ................................ 382/239, 236, 382/238, 232, 233, 245–247; 375/27, 24, 400; 3438/466; 341/67, 63, 65, 94; 714/752, 759, 795

(56) References Cited

U.S. PATENT DOCUMENTS

| 5,181,209 A | * | 1/1993 | Hagenauer et al. | ......... 714/795 |
| 5,745,504 A | * | 4/1998 | Bang | ............................ 341/67 |
| 5,886,652 A | * | 3/1999 | Adachi et al. | ................. 341/63 |
| 5,929,912 A | | 7/1999 | Aono et al. | .................. 348/398 |

FOREIGN PATENT DOCUMENTS

| EP | 0 855 838 A2 | 7/1998 | ............ H04N/7/26 |
| GB | 2 303 031 A | 2/1997 | ............ H03M/7/30 |
| JP | 5-110539 | 4/1993 | |
| JP | 5-175941 | 7/1993 | |

(List continued on next page.)

OTHER PUBLICATIONS

Hagenauer et al. ("The Performance of Rate–Compatible Punctured Convolution Codes for Digital Mobile Radio", IEEE Transactions on Communications, vol. 38, No. 7, Jul. 1990, pp. 966–980).*
Japanese Abstract No. 09121345, dated May 6, 1997.
German Abstract 19503528.
US Abstract 5929912.

*Primary Examiner*—Andrew W. Johns
*Assistant Examiner*—Duy M. Dang
(74) *Attorney, Agent, or Firm*—Sughrue Mion, PLLC (57) ABSTRACT

A video data transmitting device for discriminatively protecting compressed video data from errors according to the significance of the data and for transmitting the video data, and a video data receiving device for decompressing video data transmitted by the transmitting device, are provided. The video data transmitting device includes a compression portion for discriminating the significance of the video data, generating region information classified by regions, compressing the video data by regions according to the region information, and outputting compressed video data, and a coding portion for receiving the region information and the compressed video data, coding the compressed video data by regions according to a predetermined coding rule corresponding to the significance included in the region information using the RCPC coding method, inserting a predetermined marker into the coded data, and outputting channel-coded video data via a communications channel. The video data receiving device includes a decoding portion for receiving the channel-coded video data via the communications channel, extracting coding rate change information indicating that the coding rule has been changed by detecting a marker from channel-coded video data, and decoding the video data according to a corresponding coding rule for each region; and a decompression portion for decompressing the video data by regions with reference to region information. Thus, video data can effectively cope with errors likely to be generated on the communications channel.

33 Claims, 7 Drawing Sheets

FOREIGN PATENT DOCUMENTS

| | | |
|---|---|---|
| JP | 6-205384 | 7/1994 |
| JP | 6-507287 | 8/1994 |
| JP | 7-23346 | 1/1995 |
| JP | 7-177465 | 7/1995 |
| JP | 8-149474 | 6/1996 |
| JP | 8-154247 | 6/1996 |
| JP | 8/340258 | 12/1996 |
| JP | 10-145789 | 5/1998 |
| JP | 10-163883 | 6/1998 |
| WO | 96/09718 | 3/1996 ............ H04N/1/41 |

* cited by examiner

VIDEO DATA TRANSCEIVING DEVICE, AND TRANSCEIVING METHOD THEREOF

BACKGROUND OF THE INVENTION

1. Field of the Invention

The present invention relates to a video data transceiving device, and a transceiving method thereof, and more particularly, to a video data transceiving device for transceiving video data, which performs discriminative error protection according to the significance of the video data, and a method thereof.

2. Description of the Related Art

Compressed video data is sensitive to errors due to the characteristics of compression algorithms. Therefore, research has been done on methods for coping with errors likely to be generated during the transmission of video information via a communications channel.

Figure 1:
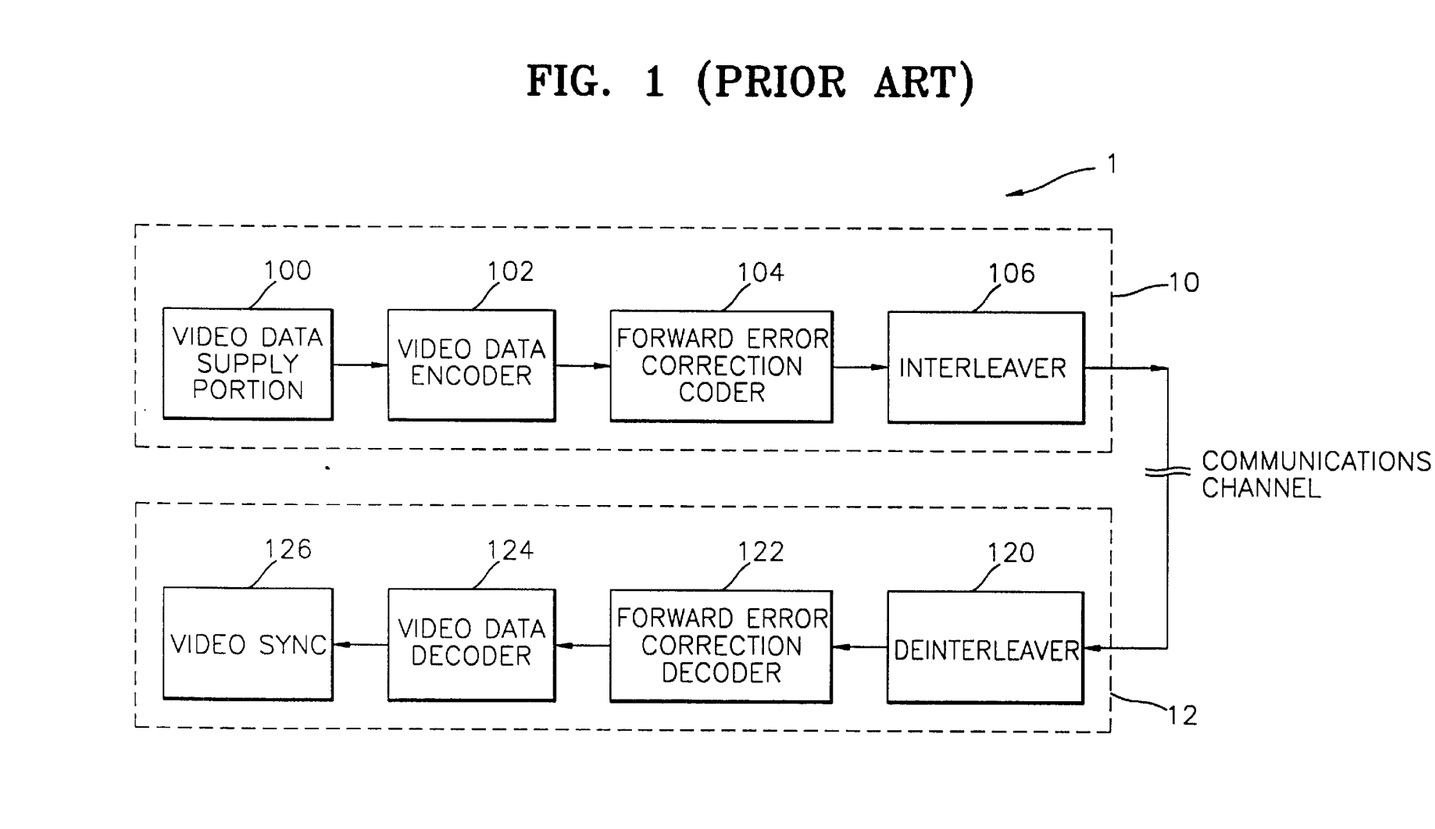
FIG. 1 is a block diagram illustrating the structure of a conventional video data transceiving device.

FIG. 1 is a block diagram illustrating the structure of a conventional video data transceiving device 1. Referring to FIG. 1, the device 1 includes a transmit stage 10 and a receive stage 12. The transmit stage 10 includes a video data supply portion 100 for supplying video data, a video data encoder 102 for compressing received video data, a forward error correction (FEC) coder 104 for adding various error correction codes including redundancy information to compressed video data provision against noise generated on a communications channel, and an interleaver 106 for interleaving a bit stream generated and output from the FEC coder 104. The receive stage 12 includes a deinterleaver 120 for recovering the interleaved bit stream, an FEC decoder 122 for decoding a signal (not shown) which is encoded by the FEC coder 104 and has error correction codes added thereto, and outputting compressed video data, a video data decoder 124 for recovering the compressed video data, and a video sync 126.

In the operation of the system 1, a video data signal output from the video data supply portion 100 is input to the video data encoder 102 and compressed. Compressed video data is input to the FEC encoder 104, and various error correction codes including redundancy information are added to the compressed video data. The interleaver 106 performs an interleaving operation of rearranging a signal output from the FEC encoder 104 in a predetermined sequence to prevent generation of burst errors liable to be generated by fading under a wireless environment, and transmits the resultant signal to a communications channel. The deinterleaver 120 performs a deinterleaving operation of receiving the signal transmitted via the communications channel and rearranging it into the original sequence. The deinterleaved signal is decoded by the FEC decoder 122. The video data decoder 124 receives the decoded signal and decompresses the decoded signal, thereby reducing video data. In this way, the conventional video data transmitting and receiving device 1 copes with noise that can be added to the communications channel.

Typically, in the device 1, it is assumed that the bits of a bit stream output from the video data encoder 102 all have the same significance. However, the compressed video data has different levels of significance. When video data of high significance is damaged by an error, degradation of the quality of an image becomes relatively serious. This problem is solved by adding a large amount of redundancy information to the video data to facilitate the restoration of the damaged video data. In this case, overhead information increases, causing a problem in that the channel rate is increased.

Figure 2:
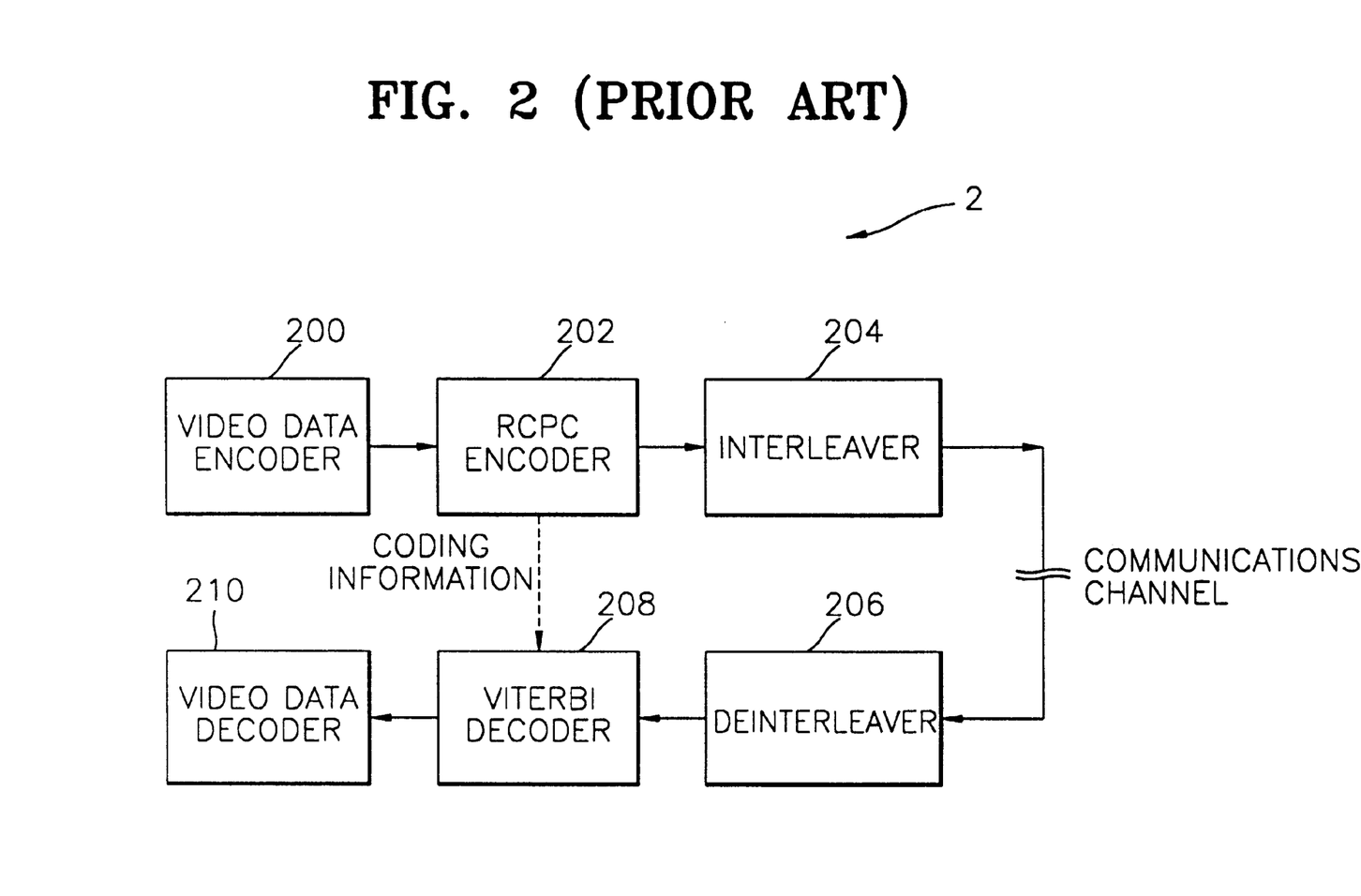
FIG. 2 is a block diagram illustrating the structure of a video data transceiving device using a conventional rate compatible punctured convolution (RCPC) coding technique.

FIG. 2 is a block diagram of a conventional video data transceiving device for fixing the above-described problem. Referring to FIG. 2, the conventional video data transceiving device 2 includes a rate compatible punctured convolution (RCPC) encoder 202 for performing RCPC.

In the operation of the device 2, first, a video data encoder 200 divides a syntax element into several grades according to the significance of the syntax element, and transmits source significance information (SSI) including the information of the grades to the RCPC encoder 202. The RCPC encoder 202 extracts puncturing rule information and transmits coding information including the above information to a viterbi decoder 208. Accordingly, the RCPC encoder 202 performs channel coding on each grade by applying an error correction coding method, and the viterbi decoder 208 decodes a channel on the basis of the puncturing rule information, thereby improving the error correction capability.

However, in the device 2, the syntax elements of compressed video data have different SSI, and variable length coding is performed according to the SSI, so that each bit stream of video data has a different length according to the significance of the video data. For a video data bit stream prior to convolution coding, its significance is frequently changed, and the coding rule corresponding to the significance is thus also frequently changed during RCPC coding. In particular, when the coding ratio is changed with respect to small sections, there is a disadvantage in that the error correction performance of the device 2 is liable to be degraded due to the characteristics of the RCPC, as compared to when a typical convolution coding method is used.

Meanwhile, a general video compression algorithm uses a variable length, coding method, uses a prediction coding technique referring to a previous frame or a previous macro block, records coding information using administrative information, and performs decoding based on the administrative information. However, when error is generated upon coding a spatially macro block, this compression algorithm is highly likely to affect the decoding of the next and successive code word. Also, when an error is generated in the coding word of a previous frame or a macro block, the compression algorithm is highly likely to affect the decoding of the next frame or macro block. Further, when an error is generated in the administrative information, the compression algorithm may affect an entire video sequence or an entire frame. Further still, in a channel coding process, the amount of data is increased by adding various error correction codes to the compressed video data.

Consequently, in a conventional video data transceiving device, it does not control an increase of data upon channel coding according to the significance of compressed video data, causing a disadvantage in that it is difficult to use a limited channel capacity effectively.

SUMMARY OF THE INVENTION

To solve the above problems, it is an objective of the present invention to provide a video data transmitting device which performs discriminative error protectional channel coding according to the significance of video data.

It is another objective of the present invention to provide a video data receiving device for receiving and restoring video data which is channel-coded by the transmitting device.

It is still another objective of the present invention to provide a video data transceiving device which performs discriminative error protectional channel coding and transmits video data by discriminative error protection of the video data according to the significance of the video data, and receiving and restoring the channel coded video data.

It is yet another objective of the present invention to provide a video data coding method performed by the transmitting device.

It is still yet another objective of the present invention to provide a video data decoding method performed by the receiving device.

Accordingly, to achieve the first objective, there is provided a video data transmitting device comprising: a compression portion for discriminating the significance of the video data, generating region information classified by regions, compressing the video data by regions according to the region information, and outputting compressed video data; and a coding portion for coding the compressed video data by regions according to a predetermined coding rule corresponding to the significance included in the region information using the RCPC coding method, and inserting a predetermined marker.

It is preferable that the compression portion comprises: a first region information supply unit for receiving the video data, dividing the video data into regions according to the significance levels of the positions of macro blocks of the video data, and generating region information indicating the significance levels. Alternatively, the first region information supply unit can divide the received video data into regions according to the significance levels of the video data discriminated by temporal frames, or according to the significance levels of the video data discriminated by temporal frames and the significance levels of the positions of macro blocks.

Preferably, the compression portion further comprises a video data compression unit which outputs information including the number of bits for each region.

It is preferable that the coding portion comprises: a first coding rule look-up table supply unit for supplying a coding rule look-up table including information associated with punctured convolution conditions depending on the significance levels by regions; and a convolution coder for performing punctured convolution coding with reference to the coding rule look-up table, inserting a predetermined marker into a region when the coding rate of the region has changed with respect to the coding rate of the previous region, and outputting a convolution-coded bit stream.

Preferably, the first coding rule look-up table supply unit supplies a coding rule look-up table set so that a small number of puncturing processes are performed on a region of high significance, and a large number of puncturing processes are performed on a region of low significance.

It is preferable that the convolution coding unit comprises: a convolution coder for performing convolution coding at a certain rate and outputting a convolution-coded bit stream; and a marker insertion and puncturing unit for receiving the convolution-coded bit stream, and inserting a predetermined marker into a region whose coding rate has been changed while performing puncture with reference to the coding rule look-up table.

Preferably, the marker includes information representing the number of bits per region, and a larger number of fixed bits are allocated to an intra frame than to an inter frame.

It is preferable that the marker is a unique bit stream with a length of (ULxN) bits formed by sequentially inputting a first k-bit bit stream, a second unique bit stream having UL bits, and a first k-bit bit stream to a rate compatible convolution coder for performing convolution coding at a certain rate N.

Preferably, the video data transmitting device further comprises an interleaver for receiving and interleaving the convolution-coded bit stream.

To achieve the second objective, there is provided a video data receiving device comprising: a decoding portion for extracting coding rate change information indicating that the coding rule has been changed by detecting a marker from channel-coded video data, and decoding the video data according to a corresponding coding rule for each region; and a decompression portion for decompressing the video data by regions with reference to region information.

Preferably, the decoding portion comprises: a marker detector for detecting a marker satisfying a predetermined uniqueness from the channel-coded video data, and supplying coding rate change information; a second coding rule look-up table supply unit for supplying a coding rule look-up table associated with the punctured convolution conditions for each region divided according to the significance of the video data, in response to the coding rate change information; and a viterbi decoder for decoding a deinterleaved signal with reference to the coding rule look-up table and the coding rate change information and outputting compressed video data.

It is preferable that the decompression portion comprises: a second region information supply unit for supplying region information divided into regions according to the significance levels of the positions of macro blocks of video data for indicating the significance levels; and a video data decompressing unit for decompressing video data by regions with reference to the region information.

Also, it is preferable that the video data receiving device further comprises a deinterleaver for deinterleaving an interleaved signal received via a communications channel.

To achieve the third objective, there is provided a video data transceiving device comprising a compression portion, a coding portion, a decoding portion, and a decompression portion. The compression portion includes a first region information supply unit for receiving video data, dividing the received video data into regions according to the significance level of the video data, and generating region information which shows the significance level, and a video data compression unit for compressing the video data by regions according to the region information and sequentially outputting compressed video data.

The coding portion includes a first coding rule look-up table supply unit for supplying a coding rule look-up table including information associated with the punctured convolution conditions, a convolution coding unit for performing punctured convolution coding with reference to the coding rule look-up table, inserting a predetermined marker into a region when the coding rate of the region has changed with respect to the coding rate of the previous region, and outputting a convolution-coded bit stream, and an interleaver for receiving and interleaving a convolution-coded bit stream.

The decoding portion includes a deinterleaver for receiving and deinterleaving a signal transmitted via the communications channel, a marker detector for detecting a marker satisfying a predetermined uniqueness from deinterleaved signals and supplying information associated with the change of a coding rate, a second coding rule look-up table supply unit for supplying a coding rule look-up table including information associated with the punctured convolution conditions in response to the coding rate change information, and a viterbi decoder for outputting compressed video data by decoding the deinterleaved signals with reference to the coding rule look-up table and the coding rate change information.

The decompression portion includes a second region information supply unit for dividing the video data into regions according to the significance levels of the video data and supplying region information indicating the significance levels, and a video data decompressing unit for restoring compressed video data by region with reference to the region information.

To achieve the fourth objective, there is provided a video data coding method including a compressing step and a coding step. In the compressing step, the significance of video data is discriminated, region information divided into regions according to the significance is generated, and the video data is compressed by regions according to the region information. In the coding step, the compressed video data is coded by regions according to the significance included in the region information using the RCPC coding, and a predetermined marker indicating that a coding rate has been changed is inserted into the coded data.

To achieve the fifth objective, there is provided a video data decoding method including a decoding step and a decompressing step. In the decoding step, a marker is detected from the channel-coded video data, coding rate change information indicating that a coding rule has been changed is extracted, and video data is decoded according to a predetermined coding rule for each region. In the decompressing step, video data is decompressed by regions with reference to region information.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENT

Figure 3A:
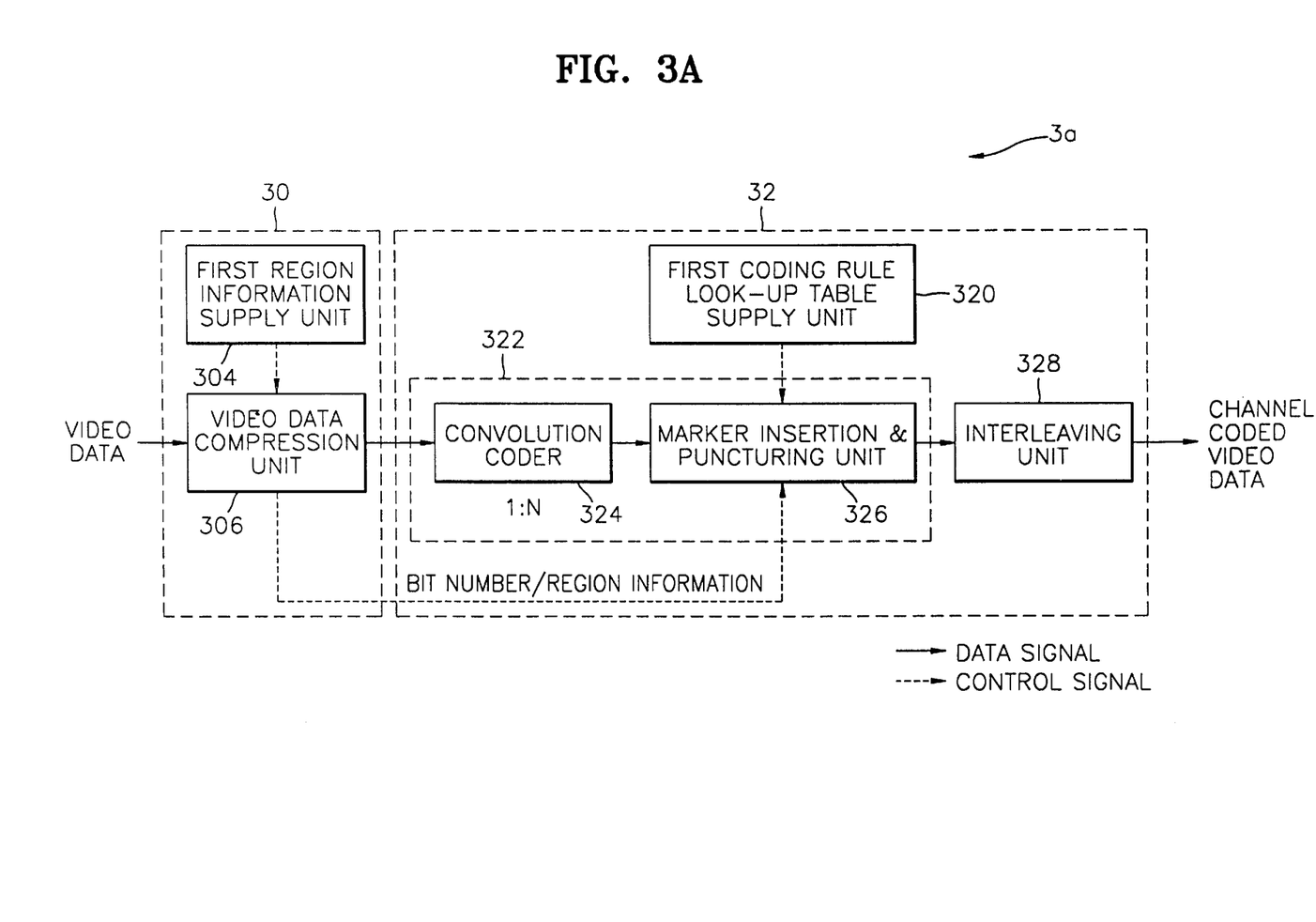
FIG. 3A is a block diagram illustrating the structure of a video data transmitting device according to the present invention.
Figure 3B:
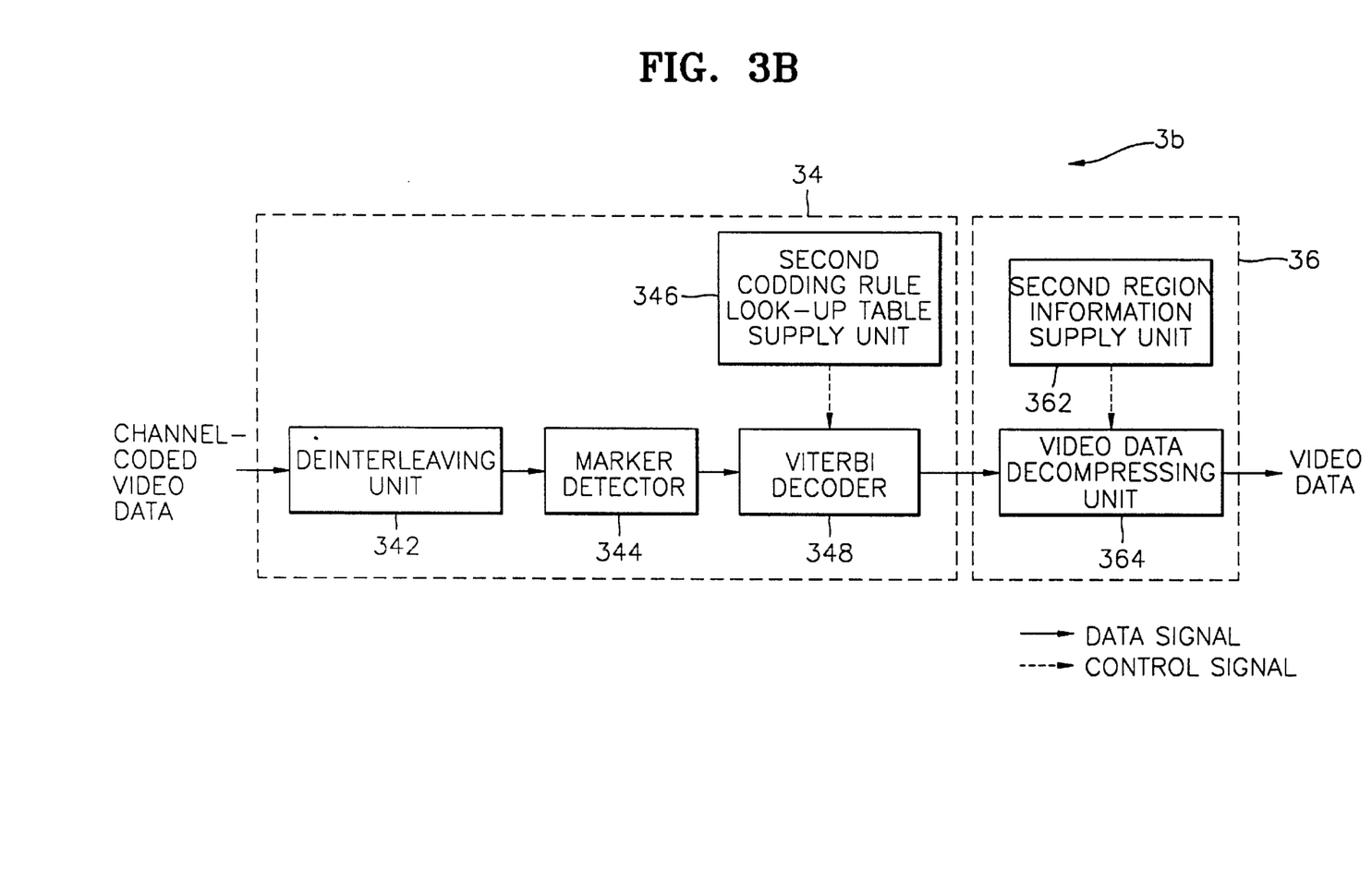
FIG. 3B is a block diagram illustrating the structure of a video data receiving device according to the present invention.

Referring to FIG. 3A, a video data transmitting device 3a, according to the present invention, includes a compression portion 30 and a coding portion 32. The compression portion 30 includes a first region information supply unit 304 and a video data compression unit 306. The coding portion 32 includes a first coding rule look-up table supply unit 320, a convolution coding unit 322, and an interleaving unit 328. The convolution coding unit 322 includes a convolution coder 324 and a marker insertion and puncturing unit 326. Referring to FIG. 3B, a video data receiving device 3b according to the present invention includes a decoding portion 34 and a decompressing portion 36. The decoding portion 34 includes a deinterleaving unit 342, a marker detector 344, a second coding rule look-up table supply unit 346, and a viterbi decoder 348. The decompression portion 36 includes a second region information supply unit 362 and a video data decompressing unit 364.

Figure 4:
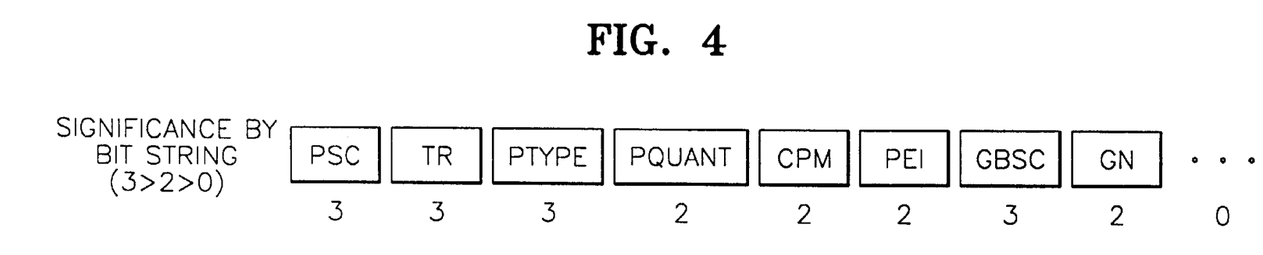
FIG. 4 is a block diagram for explaining the significance by positions of a compressed video data bit stream which is generated according to the H-263 standard on which the video data transceiving device according to the present invention can be based.

FIG. 4 shows the structure of a bit stream of compressed video data output from a video data compressor in a video data transceiving device based on an H-263 standard. Since a video data transceiving device according to the present invention applies a marker, it can be compatible with the H-263 standard which fundamentally adopts a marker. Referring to FIG. 4, the syntax elements of the compressed video data bit stream have different significance. For example, if a picture start code (PSC), a temporal reference-code (TR), and a picture type code (PTYPE) have the highest significance, e.g., a significance of 3, the other codes PQUANT, CPM, PEI and GN each have a significance of, for example, 2 that is lower than the significance of the picture start code (PSC), the temporal reference-code (TR), and the picture type code (PTYPE). As described above, the bit stream has different significance levels depending on a position within the bit stream, so that it is undesirable that an identical channel coding technique is applied to these different significance levels. In the video data transceiving device according to the present invention, considering the above-described fact, video data is divided into regions into discriminating the significance of the video data while it is being compressed, the information about the regions indicating the discriminated significance levels is encoded as a compressed video data bit stream, and convolution channel coding is performed. Here, the channel coding is accomplished by performing a different punctured convolution coding on each of the video data regions having different significance levels, on the basis of using a different coding rule look-up table for each discriminated significance. As a consequence, error protection is differentially applied according to the significance of the video data.

Referring back to FIG. 3A, the first region information supply unit 304 in the video data transmitting device 3a divides video data into regions by discriminating the significance of the video data. In this embodiment, three methods for discriminating the significance of the video data will now be described. However, this is for description only and is not intended in any way to restrict the scope of the present invention defined by the attached claims. These methods will now be described in the order of discriminating the significance by the positions of macro blocks in the video data, discriminating the significance by the frames of video data frames, and discriminating the significance by the combination of the positions and the frames.

Figure 5:
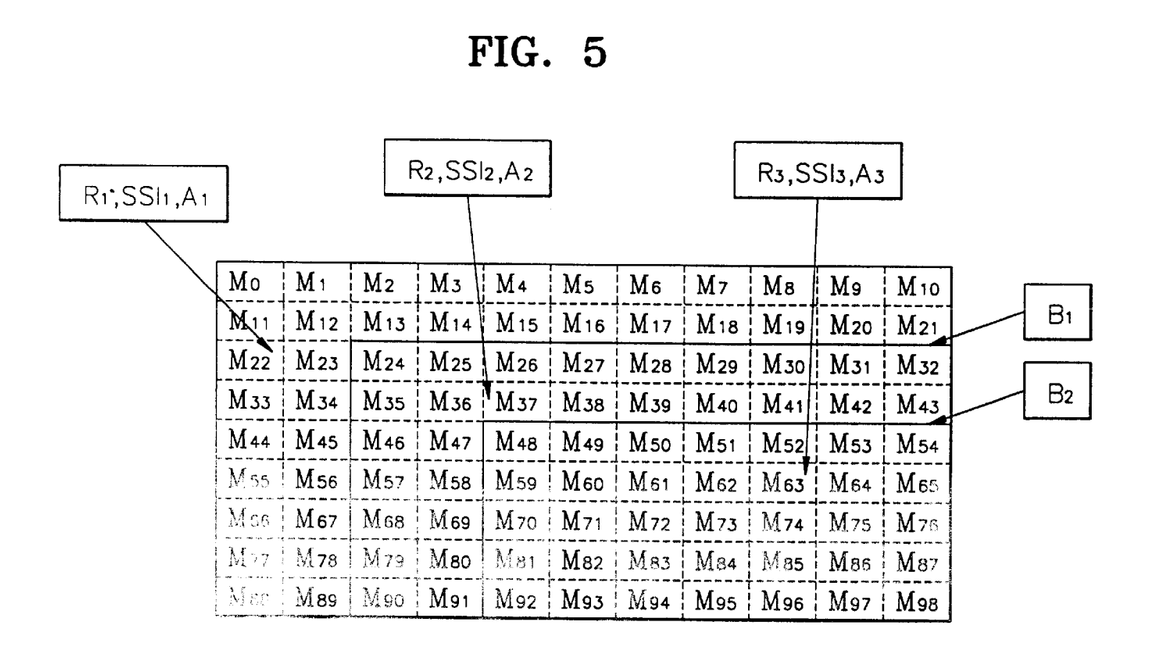
FIG. 5 is a diagram representing an example of regional segmentation for positionally discriminative error protection, applicable to a video data transceiving device according to the present invention.

FIG. 5 is a diagram representing an example of region segmentation by the significance levels of macro blocks in a frame of a quadrature common intermediate format (QCIF), as the first method among the above methods. Referring to FIG. 5, when i is a value between 0 and 98, macro blocks $M_i$ can each be divided into arbitrary regions or arbitrary boundaries. Here, it is shown as an example that each macro block is divided into regions $R_1$, $R_2$, and $R_3$, and boundaries $B_1$ and $B_2$. When the source significance information (SSI) indicating the significance of the regions $R_1$, $R_2$, and $R_3$ are represented as $SSI_1$, $SSI_2$, and $SSI_3$, when puncturing rules set to meet a necessary and sufficient condition of rate compatibility with respect to each of the regions $R_1$, $R_2$, and $R_3$ are set as $A_1$, $A_2$, and $A_3$, and when $SSI_1 > SSI_2 > SSI_3$, the relationship expressed by the following Equation 1 is accomplished:

the number of punctures of $A_1$<the number of punctures of $A_2$<the number of punctures of $A_3$ (1)

Each of the regions $R_1$, $R_2$, and $R_3$ divided as described above is encoded by applying each of the puncturing rules $A_1$, $A_2$, and $A_3$ to codes convolution-coded at a mother rate. Consequently, the region $R_1$ is coded at the lowest coding rate since it has the smallest number of punctures, and the region $R_3$ is coded at the highest coding rate since it has the largest number of punctures. In other words, protection against errors is strengthened by allocating the most redundancies to the most significant region (when it is encoded). The possibility that a more significant portion can be damaged by an error is reduced by using such a variable coding rate method. Meanwhile, the macro blocks $M_0$ through $M_{98}$ are sequentially encoded by a video encoder (not shown), and the bit stream depending on encoding is stored corresponding buffer (not shown). The bit stream is RCPC-coded at a predetermined rate.

Figure 6:
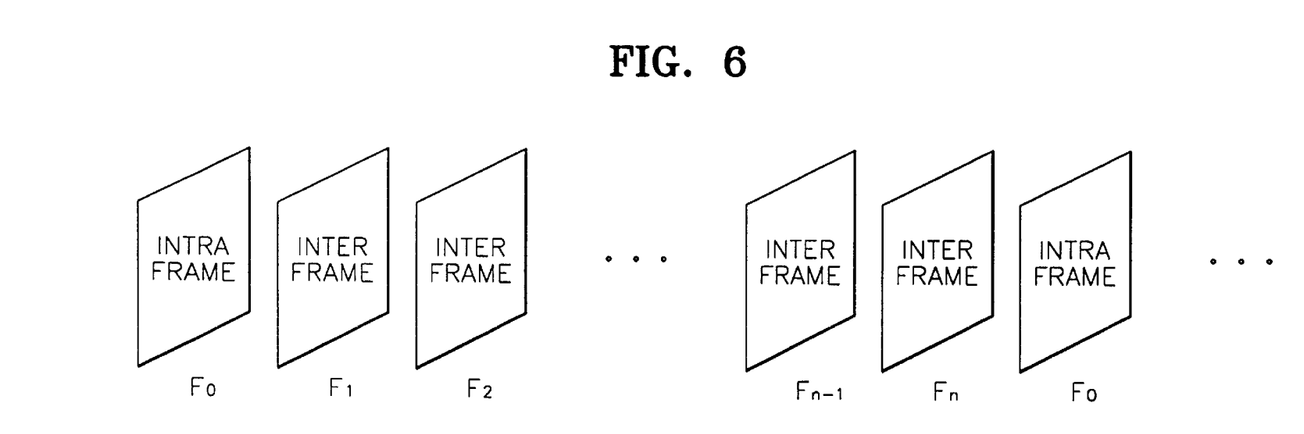
FIG. 6 is a diagram representing an example of regional segmentation for temporally discriminative error protection, applicable to a video data transceiving device according to the present invention.

FIG. 6 shows an example of region segmentation by frames according to the time of a video data frame as the second method among the above-mentioned methods. Referring to FIG. 6, when an initial intra frame generated under the condition of t=0 is represented as $F_0$, and n denotes an arbitrary integer, inter frames $F_1$, $F_2$, . . . , $F_n$ are sequentially generated, and an intra frame $F_0$ is then generated under the condition of t=0. In general, the relationship in size between frame source significance information $FSSI_0$ through $FSSI_n$ indicating the significance of frames according to the characteristics of a video compressing device is as expressed by the following Equation 2:

$$FSSI_0 > FSSI_1 > \ldots > FSSI_n \quad (2)$$

Accordingly, the relationship in size between the puncturing rules $FA_i$ of frames is as expressed by the following Equation 3:

the number of $FA_0$<the number of $FA_1$< . . . <the number of $FA_n$(3)

In general, since many inter pictures can exist between intra pictures, the above Equations can be generalized as expressed by the following Equation 4:

$$(FSSI_0 \ldots FSSI_{i-1}) > (FSSI_i \ldots FSSI_{j-m}) > \ldots > (FSSI_j \ldots FSSI_n) \quad (4)$$

wherein i, j, m, and n denote arbitrary integers.

Figure 7:
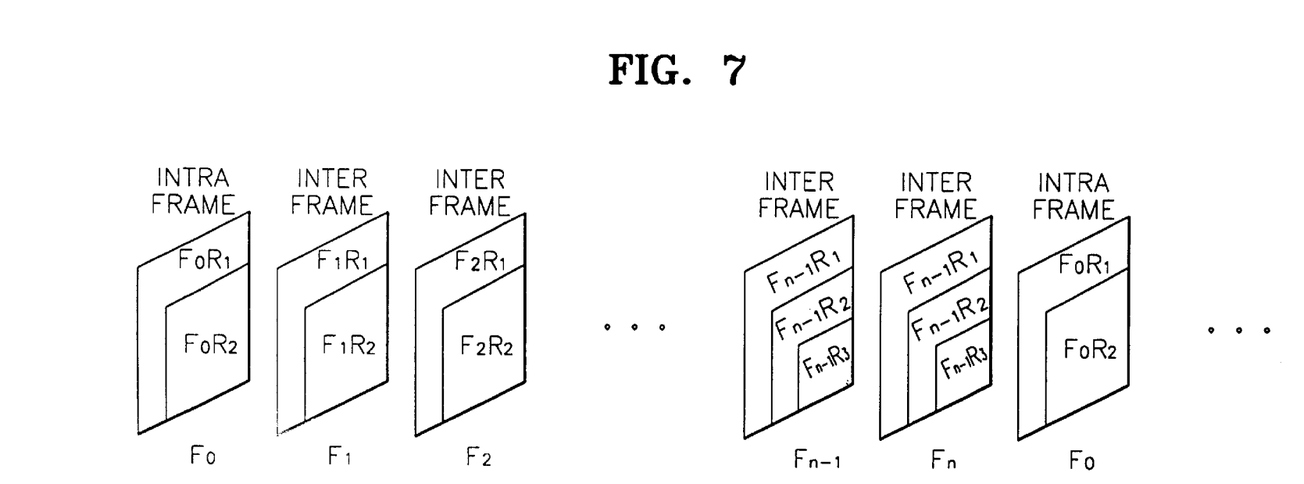
FIG. 7 is a diagram representing an example of regional segmentation for temporally and positionally discriminative error protection, applicable to a video data transceiving device according to the present invention.

FIG. 7 is a view for explaining a differential protection method by region-time formed by combining the differential protection method by region described with reference to FIG. 5 and the differential protection method by time described with reference to FIG. 6, as a third method among the three above-described significance discrimination methods. Referring to FIG. 7, when an initial intra frame generated under the condition of t=0 is represented as $F_0$, and n denotes an arbitrary integer, inter frames $F_1$, $F_2$, . . . , $F_n$ are sequentially generated until t becomes n. Then, an intra frame $F_0$ is generated under the condition of t=0. Each of the frames $F_0$, $F_1$, . . . , $F_n$ can be divided into first and second regions $R_1$ and $R_2$ according to the significance of the position of each of the macro blocks. If video data is comprised of n frames, and each frame is divided into an arbitrary in number of regions, the coding rule $FA_j$ of each frame is expressed by the following Equation 5:

$$FA_j = \{\{F_0R_1, \cdots, F_0R_m, F_0B_1, \cdots, F_0B_{(m-1)}, F_0A_0, \cdots, F_{0A_{0(m)}}\}, \quad (5)$$
$$\{F_1R_1, \cdots, F_1R_m, F_1B_1, \cdots, F_1B_{(m-1)}, F_1A_0, \cdots, F_1A_{0_m}\},$$
$$\{F_nR_1, \cdots, F_nR_m, F_nB_1, \cdots, F_nB_{(m-1)}, F_nA_0, \cdots, F_nA_{0(m)}\}\}$$

The operation of the video data transmitting device 3a as described above will now be described referring to FIG. 3A. In FIG. 3A, a data signal representing the flow of video data is indicated by a solid line, and a control signal not representing video data is indicated by a dotted line.

In the compression portion 30, the first region information supply unit 304 divides video data by discriminating the significance of the video data according to one method among the significance discrimination methods described above referring to FIGS. 5 through 7, and generates and outputs region information indicating the significance of the video data. Here, the region information can include region data representing the region in which the corresponding video data exists, source significance information representing the significance of a corresponding region, and coding rule information representing the coding rule with respect to the corresponding region. Since it is desirable to generate the region information during the compression of the video data, it is represented that video data is not input to the region information supply unit 304. The video data compression unit 306 compresses the video data by regions according to the region information and sequentially outputs compressed video data. In this embodiment, the video data compression unit 306 outputs information on the number of bits per region corresponding to information including the number of bits for each region. Here, it is preferable that the information on the number of bits per region represents the number of bits of each of segmented regions of each frame as a fixed bit number, in consideration of the fact that a marker is very sensitive to an error. That is, in the case of region division by frames according to time described above with reference to FIGS. 6 and 7, an intra frame generally has about ten times the number of bits as the inter frame, so that it is preferable that different numbers of fixed bits are allocated to the inter frame and the intra frame. That is, it is preferable that a small number of bits are allocated to the inter frame, and a relatively large number of bits are allocated to the intra frame.

In the coding portion 32, the first coding rule look-up table supply unit 320 supplies a coding rule look-up table including the information associated with the punctured convolution conditions. The convolution coding unit 322 performs punctured convolution coding with reference to the first coding rule look-up table. Here, it is preferable that the first coding rule look-up table is comprised so that a small number of puncturings can be performed on a more significant region, and a large number of puncturings can be performed on a less significant region. The convolution coding unit 322 outputs a convolution-coded bit stream by inserting a marker into a region in which a coding rate has been changed. In this embodiment, the convolution coder 324 of the convolution coding unit 322 performs convolution coding to output a convolution-coded bit stream, and the marker insertion and puncturing unit 326 receives the convolution-coded bit stream and inserts a marker into the region whose coding rate has been changed while performing puncturing with reference to the first coding rule look-up table. A marker inserted into the convolution-coded bit stream must have uniqueness, and a method of adding and transmitting a syntax representing the number of bits for each region can be used as a marker generation method. A bit stream into which a puncturing convolution and a marker has been inserted is interleaved by the interleaver 328 and transmitted to a communications channel. This channel-coded bit stream is differentially protected from errors according to its significance.

The operation of the video data transmitting device 3b will now be described with reference to FIG. 3B. In FIG. 3B, a data signal representing the flow of video data is indicated by a solid line, and a control signal not representing video data is indicated by a dotted line, similar to in FIG. 3A.

When a transmitted signal is received via a communications channel, the deinterleaving unit 342 in the decoding portion 34 performs deinterleaving. The marker detector 344 detects a marker having a predetermined uniqueness from the deinterleaved signal and extracts coding rate change information from the marker. The second coding rule look-up table supply unit 346 supplies a coding rule look-up table including the information associated with the punching convolution conditions in response to the coding rate change information. The second coding rule look-up table is based on the first coding rule look-up table used upon coding. The viterbi decoder 348 decodes the deinterleaved signal with reference to the second coding rule look-up table and the coding rate changing information to thereby output compressed video data.

In the decompressing portion 36, the second region information supply unit 362 supplies region information on regions classified according to the significance by positions of video data for representing the significance levels. The region information is equal to region information supplied by the first region information supply unit 304 in the compression portion 30. The video data decompressing unit 364 decompresses video data by regions with reference to the region information and outputs video data.

In the embodiment of the present invention described above, the video data compression unit 306 in the compression portion 30 outputs information representing the number of bits per region, and the convolution coding unit 322 in the coding portion 32 inserts the information into a marker. The marker detector 344 in the decoding portion 34 extracts both the coding rate change information and the information associated with the number of bits per region included in the marker, depending on whether the marker is detected. Accordingly, when the viterbi decoder 348 performs decoding, the number of bits in a region can be recognized by referring to the information associated with the number of bits per region included in the marker. Thus, the viterbi decoder 348 can perform decoding by regions.

Figure 9:
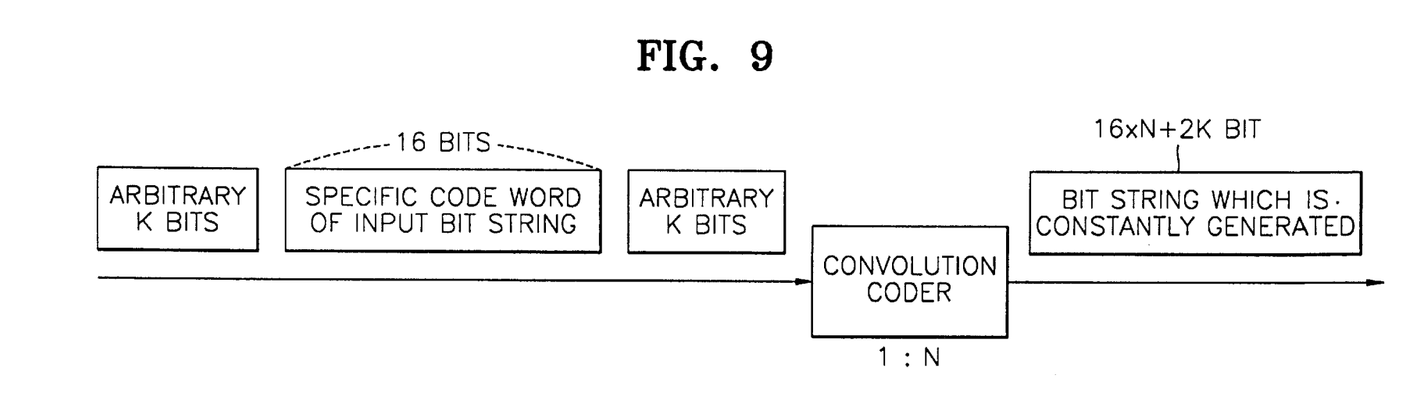
FIG. 9 shows an example of a method for producing a marker with respect to an RCPC-coded bit stream in a video data transceiving device according to the present invention.

An alternative to inserting a marker will now be described. Since the bit stream into which the marker is inserted is a convolution-coded data bit stream, the marker must be formed using a different code to the above-used code. FIG. 9 shows an example of a marker generating process using the alternative convolution coding method. Referring to FIG. 9, for example, when k is set to be an arbitrary integer representing a constraint length, a convolution coder having a predetermined coding rate (e.g., 1:N where N is a positive real number) receives a bit stream to which information of k bits is attached at the leading and rear ends of a unique code word such as 16 consecutive bits of "0" in a H-263 standard. The convolution coder of FIG. 9 for generating a marker convolution-codes the bit stream and outputs a bit stream having a length of($16 \times N + 2 \times k$) bits. Preferably, the marker is a bit stream having a length of ($16 \times N$) bits which is constantly generated among the bit streams. This marker is inserted into a bit stream convolution-coded by the convolution coding unit 322, interleaved by the interleaving unit 328, and transmitted to a communications channel. In the decoding portion 34, the marker detector 344 extracts the coding rate change information by detecting a unique marker, and decoding is performed by considering the corresponding region to continue until the next marker is received. Accordingly, the viterbi decoder 348 performs decoding until the unique marker is detected, so that decoding by regions is accomplished.

Figure 8:
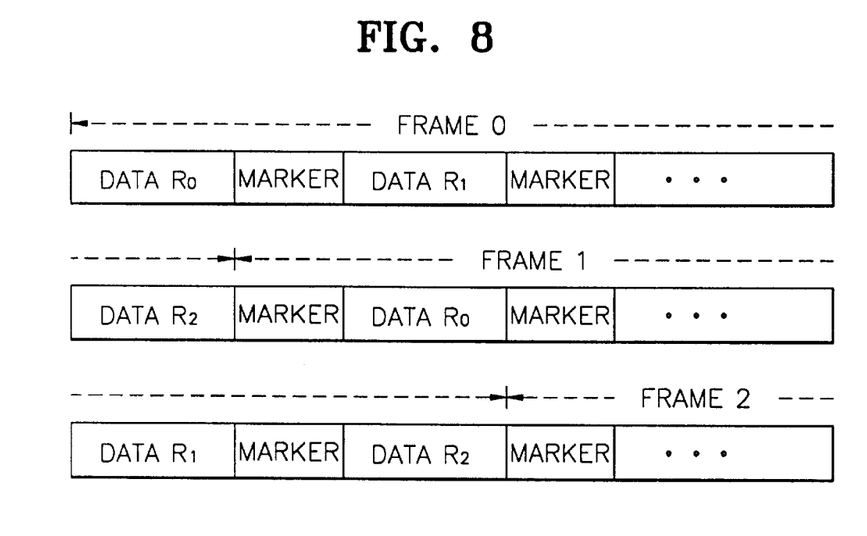
FIG. 8 shows an example of the structure of a bit stream coded by a rate compatible punctured convolution (RCPC) in a video data transceiving device according to the present invention.

FIG. 8 shows an example of a frame bit stream into which a marker has been inserted by the video data transmitting device according to the present invention. Referring to FIG. 8, region data $R_0$, $R_1$, and $R_2$ are arranged by regions in each of frame 0, frame 1, and frame 2, and a marker is inserted between the region data $R_0$, $R_1$, and $R_2$ whose coding rate is to be changed. Thus, region data bit streams with different coding rates are separated from each other by a marker, so that each of the region data $R_0$, $R_1$, and R2 can be coded at its corresponding coding rate. The video data transmitting device, the video data receiving device, and the video data transceiving device according to the present invention use the marker as described above, so that compatibility with the H-263 standard is provided.

As described above, the video data transmitting device according to the present invention performs channel coding by differentially protecting video data from an error according to the significance of the video data, and the video data receiving device according to the present invention channel-decodes and restores video data differentially protected from an error when being received, in order to effectively cope with errors likely to be generated on a communication channel. Also, a plurality of frames are treated as one unit, so that a fixed number of puncturing rules can be applied to an arbitrary frame, and that the complication of a system caused by changing the coding rate at any time can be reduced.

What is claimed is:

1. A video data transmitting device using discriminative error protection for compressing video data, differentially protecting the video data from errors using rate compatible punctured convolution (RCPC) coding, and transmitting the video data, the device comprising:

a compression portion for generating region information based on respective significance of regions of the video data without reference to syntax elements of the video data, compressing the video data by regions according to the region information, and outputting compressed video data; and a coding portion for coding the compressed video data by regions according to a predetermined coding rule corresponding to the significance included in the region information using the RCPC coding method, and inserting a predetermined marker.

2. The video data transmitting device using discriminative error protection as claimed in claim 1, wherein the compression portion comprises:

a first region information supply unit for receiving the video data, dividing the video data into regions according to the significance levels of the positions of macro blocks of the video data, and generating region information indicating the significance levels; and a video data compression unit for compressing the video data regions according to the region information and sequentially outputting compressed video data.

3. The video data transmitting device using differential error protection as claimed in claim 1, wherein the compressing portion comprises:

a region information supply unit for receiving the video data, dividing the video data into regions according to the significance levels of the video data discriminated by temporal frames, and generating region information indicating the significance levels; and a video data compression unit for compressing the video data regions according to the region information and sequentially outputting compressed video data.

4. The video data transmitting device using discriminative error protection as claimed in claim 1, wherein the compression portion comprises:

a first region information supply unit for receiving the video data, dividing the video data into regions according to the significance levels of the video data discriminated by temporal frames and the significance levels of the positions of macro blocks of the video data, and generating region information indicating the significance levels; and a video data compression unit for compressing the video data regions according to the region information and sequentially outputting compressed video data.

5. The video data transmitting device using discriminative error protection as claimed in one of claims 2 through 4, wherein the video data compression unit outputs information including the number of bits for each region.

6. The video data transmitting device using discriminative error protection as claimed in claim 1, wherein the coding portion comprises:

a first coding rule look-up table supply unit for supplying a coding rule lookup table including information associated with punctured convolution conditions depending on the significance levels by regions; and a convolution coding unit for performing punctured convolution coding with reference to the coding rule look-up table, inserting a predetermined marker into a region when the coding rate of the region has changed with respect to the coding rate of the previous region, and outputting a convolution-coded bit stream.

7. The video data transmitting device using discriminative error protection as claimed in claim 6, wherein the first coding rule look-up table supply unit supplies a coding rule look-up table set so that a small number of puncturing processes are performed on a region of high significance, and a large number of puncturing processes are performed on a region of low significance.

8. The video data transmitting device using discriminative error protection as claimed in claim 6, wherein the convolution coding unit comprises:

a convolution coder for performing convolution coding at a certain rate and outputting the convolution-coded bit stream; and a marker insertion and puncturing unit for receiving the convolution-coded bit stream, and inserting a predetermined marker into a region whose coding rate has been hanged while performing puncture with reference to the coding rule look-up table.

9. The video data transmitting device using discriminative error protection as claimed in claim 1 or 8, wherein the marker includes information representing the number of bits per region.

10. The video data transmitting device using discriminative error protection as claimed in claim 9, wherein a larger number of fixed bits are allocated to an intra frame than to an inter frame.

11. The video data transmitting device using discriminative error protection as claimed in claim 1 or 8, wherein the marker is a unique bit stream with a length of (UL×N) bits formed by sequentially inputting a first k-bit bit stream, a second unique bit stream having UL bits, and a first k-bit bit stream to a rate compatible convolution coder for performing convolution coding at a certain rate N.

12. The video data transmitting device using discriminative error protection as claimed in claim 8, further comprising an interleaver for receiving and interleaving the convolution-coded bit stream.

13. A video data receiving device using discriminative error protection for decoding video data which is compressed, differentially protected from errors using the RCPC coding method, and transmitted via a communications channel, and restoring the video data, the device comprising:

a decoding portion for extracting coding rate change information indicating that the coding rule has been changed by detecting a marker from the channel-coded video data, and decoding the video data according to a corresponding coding rule for each region; and a decompression portion for decompressing the video data by regions with reference to region information, wherein the region information is established based on respective significance of regions of the video data without reference to syntax elements of the video data.

14. The video data receiving device using discriminative error protection as claimed in claim 13, wherein the decoding portion comprises:

a marker detector for detecting a marker satisfying a predetermined uniqueness from the channel-coded video data, and supplying coding rate change information;

a second coding rule look-up table supply unit for supplying a coding rule look-up table associated with the punctured convolution conditions for each region divided according to the significance of the video data, in response to the coding rate change information; and a viterbi decoder for decoding a deinterleaved signal with reference to the coding rule look-up table and the coding rate change information and outputting compressed video data.

15. The video data receiving device using discriminative error protection as claimed in claim 13, wherein the decompression portion comprises:

a second region information supply unit for supplying region information divided into regions according to the significance levels of the positions of macro blocks of video data for indicating the significance levels; and a video data decompressing unit for decompressing video data by regions with reference to the region information.

16. The video data receiving device using discriminative error protection as claimed in claim 13, wherein the decompression portion comprises:

a second region information supply unit for supplying region information divided into regions according to the significance levels of the frames of macro blocks of video data for indicating the significance levels; and a video data decompressing unit for decompressing video data by regions with reference to the region information.

17. The video data receiving device using discriminative error protection as claimed in claim 13, wherein the decompression portion comprises:

a second region information supply unit for supplying region information divided into regions according to the significance levels of the temporal frames of video data and the significance levels of the positions of macro blocks of the frames for indicating the significance levels; and a video data decompressing unit for decompressing video data by regions with reference to the region information.

18. The video data receiving device using discriminative error protection as claimed in claim 13, further comprising a deinterleaver for deinterleaving an interleaved signal received via a communications channel.

19. A video data coding method using discriminative error protection for compressing video data, and discriminatively protecting the video data from errors using rate compatible punctured convolution (RCPC) coding, the method comprising the steps of:

(a) a compressing step including the substeps of:
  (a-1) discriminating the significance of video data;
  (a-2) generating region information divided into regions according to the significance, the region information being generated without reference to syntax elements of the video data; and
  (a-3) compressing the video data by regions according to the region information, and (b) a coding step including the substeps of:
  (b-1) coding the compressed video data by regions according to the significance included in the region information using the RCPC coding; and
  (b-2) inserting a predetermined marker indicating that a coding rate has been changed, to the coded data.

20. The video data coding method using differential error protection as claimed in claim 19, wherein the region information generation step includes the step of generating region information divided into regions according to the significance level for each position of a macro block of video data.

21. The video data coding method using discriminative error protection as claimed in claim 19, wherein the region information generation step includes the step of generating region information divided into regions according to the significance for each frame of video data.

22. The video data coding method using discriminative error protection as claimed in claim 19, wherein the region information generation step includes the step of generating region information divided into regions according to the significance for each frame of video data and for each position of a macro block of each frame.

23. The video data coding method using discriminative error protection as claimed in claim 19, wherein the video data compressing step includes the substeps of: compressing the video data by regions according to the region information and sequentially outputting compressed video data; and outputting information including the number of bits for each region.

24. The video data coding method using discriminative error protection as claimed in claim 19, wherein the convolution coding step is the step of performing RCPC coding according to the coding rule look-up table set so as to allocate a small number of puncturing processes to a high significant region and a large number of puncturing processes to a low significant region, and the convolution coder inserts a marker including information associated with the number of bits for each region with reference to the first information.

25. The video data coding method using discriminative error protection as claimed in claim 19, wherein the marker includes information indicating the number of bits for each region.

26. The video data coding method using discriminative error protection as claimed in claim 20, wherein a larger number of fixed bits are allocated to an intra frame than to an inter frame.

27. The video data coding method using discriminative error protection as claimed in claim 19, further comprising the step of interleaving a convolution-coded bit stream.

28. A video data decoding method using discriminative error protection for decoding channel-coded video data which is compressed, discriminatively protected from errors using RCPC coding, and transmitted via a communications channel, the method comprising:

(a) a decoding step; and
(b) a decompressing step of decompressing video data by regions with reference to region information, wherein the region information is established based on respective significance of regions of the video data, without reference to syntax elements of the video data, wherein the decoding step (a) comprises the substeps of:
  (a-1) detecting a marker from the channel-coded video data;
  (a-2) extracting coding rate change information indicating that a coding rule has been changed; and
  (a-3) decoding video data according to a predetermined coding rule for each region.

29. The video data decoding method using discriminative error protection as claimed in claim 28, wherein the decoding step (a-3) comprises:

a marker detecting step of detecting a marker satisfying a predetermined uniqueness from deinterleaved signals and supplying coding rate change information;

a second coding rule look-up table supplying step of supplying a coding rule look-up table including information associated with punctured convolution conditions in response to the coding rate change information; and viterbi decoding step of outputting compressed video data by decoding the deinterleaved signals with reference to the coding rule look-up table and the coding rate change information.

30. The video data decoding method using discriminative error protection as claimed in claim 28, wherein the decompressing step comprises the substeps of:

supplying second region information that is divided by regions according to the significance level for each position of a macro block of video data and indicates the significance level; and decompressing video data by regions with reference to the region information.

31. The video data decoding method using discriminative error protection as claimed in claim 28, wherein the restoring step comprises the substeps of:

supplying second region information that is divided by regions according to the significance level for each temporal frame of video data and indicates the significance level; and decompressing video data by regions with reference to the region information.

32. The video data decoding method using discriminative error protection as claimed in claim 28, wherein the decompressing step comprises the substeps of:

supplying second region information that is divided by regions according to the significance level for each temporal frame of a macro block of video data and for each position of a macro block of each frame and indicates the significance level; and decompressing video data by regions with reference to the region information.

33. The video data decoding method using discriminative error protection as claimed in claim 28, further comprising the step of receiving interleaved data via a communications channel and deinterleaving the interleaved video data.

* * * * *